(12) United States Patent
Rojey et al.

(10) Patent No.: US 7,687,050 B2
(45) Date of Patent: Mar. 30, 2010

(54) PROCESS FOR PRODUCING SYNTHESIS GAS BY STEAM REFORMING AND PARTIAL OXIDATION

(75) Inventors: Alexandre Rojey, Rueil Malmaison (FR); Stephane Bertholin, Villeurbanne (FR); Fabrice Giroudiere, Orlienas (FR); Eric Lenglet, Rueil Malmaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 379 days.

(21) Appl. No.: 11/523,741

(22) Filed: Sep. 20, 2006

(65) Prior Publication Data

US 2008/0069766 A1    Mar. 20, 2008

(30) Foreign Application Priority Data

Sep. 21, 2005    (FR)    ................... 05 09670

(51) Int. Cl.
*C01B 3/24*    (2006.01)
*C01B 3/00*    (2006.01)
*B01J 8/06*    (2006.01)

(52) U.S. Cl. ...................... 423/650; 423/652

(58) Field of Classification Search ............... 423/650; C01B 3/00, 3/38; B01J 8/02, 8/06
See application file for complete search history.

(56) References Cited

U.S. PATENT DOCUMENTS

| 4,714,593 A | 12/1987 | Naito |
| 7,261,751 B2 * | 8/2007 | Dutta et al. ................ 48/198.1 |
| 2007/0041894 A1 * | 2/2007 | Drnevich .................... 423/650 |

FOREIGN PATENT DOCUMENTS

| DE | 3345088 A1 | 6/1985 |
| FR | 1490005 A | 7/1967 |
| WO | WO 0202220 A | 1/2002 |
| WO | WO 03070629 A1 | 8/2003 |
| WO | WO 2004083115 A | 9/2004 |

* cited by examiner

*Primary Examiner*—Jerry Lorengo
*Assistant Examiner*—Joseph V Micali
(74) *Attorney, Agent, or Firm*—Millen, White, Zelano & Branigan, P.C.

(57) ABSTRACT

For producing synthesis gas, SG, from a hydrocarbon feed and optionally from recycled compounds, F, a first feed F1 supplemented with steam undergoes steam reforming in a multi-tube reactor-exchanger R comprising a plurality of reaction tubes (38) containing a steam reforming catalyst and a shell containing said tubes, to produce a first synthesis gas SG1; reaction tubes (38) are heated principally by convection by circulating a fluid HF in the shell external to said tubes, in which HF is a staged partial oxidation stream with oxygen of a second feed F2 at a pressure in the range 0.5 to 12 MPa, to produce a second synthesis gas SG2; and the synthesis gas SG is produced by mixing SG1 and SG2.

24 Claims, 5 Drawing Sheets

PROCESS FOR PRODUCING SYNTHESIS GAS BY STEAM REFORMING AND PARTIAL OXIDATION

This application corresponds to a concurrently filed U.S. patent application for "PROCESS FOR PRODUCING SYNTHESIS GAS BY STEAM REFORMING IN A REACTOR-EXCHANGER", invented by Alexandre Rojey, Stephane Bertholin, Fabrice Giroudiere and Eric Lenglet, and was filed as French Application No. 05/09.670 on Sep. 21, 2005.

FIELD OF THE INVENTION

The invention relates to the production of synthesis gas from natural gas or light hydrocarbons: methane, ethane, propane, butane, or hydrocarbons containing less than 10 carbon atoms, and mixtures thereof.

Synthesis gas is a mixture principally composed (after eliminating water) of hydrogen, carbon monoxide and carbon dioxide. It often contains small quantities of residual hydrocarbons, typically methane.

Synthesis gas may be used to produce hydrogen. It may also be used to produce liquid compounds by chemical conversion, for example of oxygen-containing compounds (methanol, dimethyl ether, etc) or hydrocarbons, in particular olefins or paraffins.

PRIOR ART

Several methods for producing synthesis gas are already known, in particular steam reforming, partial oxidation and the autothermal process.

Steam reforming (known also as SMR, steam methane reforming) consists of reacting the feed over a catalyst in the presence of steam to obtain a synthesis gas which (apart from steam) principally contains a mixture of oxides of carbon and hydrogen. That operation is endothermic. It is typically carried out by circulating the feed, in the presence of steam, in tubes filled with catalyst (generally a nickel catalyst, for example comprising 6% to 25% by weight of nickel deposited on a support principally comprising alumina, or a mixture of alumina and one or more refractory compounds). The tubes are heated by radiation in tube furnaces. The hottest points of the flame must be kept sufficiently distant from the tubes so that they do not excessively overheat and for this reason, the furnaces used are bulky and expensive.

Steam reforming in a reactor-exchanger (meaning that the heat is mainly transmitted by convection and not mainly by radiation as in a furnace) has already been proposed; the reaction medium is heated indirectly by very high temperature fumes.

Using very high temperature fumes in an exchanger turns out, however, to be difficult.

Partial oxidation (known as POX) consists of forming a high temperature mixture—generally between 1000° C. and 1600° C.—of hydrocarbons and air or oxygen by combustion under sub-stoichiometric conditions to oxidize the hydrocarbons and obtain a synthesis gas. That process uses large quantities of oxygen when air cannot be used (when a nitrogen-free synthesis gas is required).

The autothermal process carries out partial oxidation immediately followed by catalytic steam reforming in the adiabatic region at high temperature, for example in the 900° C.-1000° C. range for the outlet temperature. That process combines the two preceding reaction modes in series. It consumes less oxygen than the POX process, but requires a catalytic bed.

One aim of the process of the invention is to produce synthesis gas from light hydrocarbons in a facility which is much more compact than a conventional steam reforming facility, typically necessitating less oxygen than POX and autothermal processes. The process of the invention is thus a high performance process from the energetic viewpoint, with a reduced bulk and limited investment costs.

In a preferred variation, the invention can also reduce the highest temperatures employed while keeping the energy efficiency high. This increases reliability and service life in the facility.

BRIEF DEFINITION OF THE INVENTION

To achieve the aims mentioned above, the invention employs a particular combination of synthesis gas (SMR) and partial oxidation (POX). However, in contrast to the autothermal process, which uses a mixture of all of the reactants and chemical conversion of the mixture, the process of the invention carries out POX with oxygen, and indirect heat exchange to transfer excess heat from said POX to a reactor-exchanger SMR of the compact reactor-exchanger type. This means that steam reforming is deeper and thus encourages the production of $H_2$ and CO. The $H_2$ potential (hydrogen obtained after converting CO steam) is thus higher and the oxygen requirement is lower compared with the autothermal process.

The two synthesis gases obtained (by POX and SMR) are then typically mixed, which increases the quantity of synthesis gas obtained compared with processes using combustion in air to heat the synthesis gas tubes. Finally, the $CO_2$ produced can readily be recovered downstream as it is not diluted with large volumes of nitrogen.

From the point of view of compactness, this is excellent: on the one hand, the synthesis gas produced by POX has better heat transfer properties by convection compared than that of fumes from combustion in air. On the other hand, POX may be carried out at high pressure (without necessitating compression of the nitrogen from the air), which greatly increases the compactness and reduces the exchange surface necessary (there is an increase in the convective exchanges in the gas phase with pressure). The surfaces necessary for heat transfer, and thus the costs, may be substantially reduced.

In a variation of the process of the present invention, it has also been discovered that it is possible to carry out partial oxidation in a more compact and cheaper facility by carrying it out in a reactor-exchanger which is much more compact than a furnace as long as the presence of a flame at the steam reforming tubes is avoided, eliminating hot spots as they may result in deterioration or destruction of these tubes.

Thus, the invention allows the steam reforming operation to be carried out in a reactor-exchanger by developing a flameless combustion reaction inside the shell of the reactor-exchanger R, more or less at the level of the steam reforming tubes.

DETAILED DESCRIPTION OF THE INVENTION

The references indicated above correspond to those used below in the description of the accompanying Figures. In the following, the expressions "partial combustion" and "partial oxidation", or "POX", are used interchangeably.

The invention provides a process for producing a synthesis gas, SG, from a general feed F constituted by hydrocarbons and optionally from recycled compounds, F comprising a first feed F1 and a second feed F2, in which:

a stream comprising the first feed F1 supplemented with steam undergoes steam reforming in at least one multi-tube reactor-exchanger R comprising a plurality of reaction tubes containing a steam reforming catalyst and a shell containing said tubes, to produce at least one fraction of synthesis gas SG1;

said reaction tubes are-heated principally by convection by circulating a heating fluid HF external to said tubes in said shell, in which HF is a substantially free of nitrogen partial oxidation stream of the second feed F2 with oxygen at a pressure in the range 0.5 to 12 MPa to produce a second synthesis gas SG2;

synthesis gas SG is produced by mixing SG1 and SG2. SG1 and SG2 are typically mixed downstream of the reactor-exchanger R, but may also be carried out in the shell of R, for example substantially at one end of said shell or of R.

Feeds F1 and F2 may be diverse, gaseous and/or liquid. They may be of the same or different compositions. Usually, however, feeds F1 and F2 are essentially gaseous at a pressure of 2 MPa and at a temperature of 20° C. Typically, F1 and F2 are of identical composition and derive from a natural or purified gas, or from a gaseous mixture principally composed, as a molar %, of hydrocarbons containing less than 5 carbon atoms.

F1 and F2 (or only one thereof, for example F2) may also comprise a recycle stream, in particular a stream comprising a fraction separated downstream, such as a fraction of SG separated by pressure swing adsorption (PSA) to produce hydrogen. Such recycled fractions often contain CO and non transformed methane, and typically also $CO_2$.

Due to the partial oxidation under pressurized oxygen, a high pressure thermal fluid HF having very good heat exchange properties can transfer a large quantity of heat in a relatively compact reactor-exchanger.

In a preferred variation of the invention, the POX is carried out in a staged manner: typically, the heating fluid HF comprises at least a first partial oxidation stream with oxygen of a first portion of F2, usually supplemented with steam, which is circulated in the reactor-exchanger to heat the reaction tubes, then it is mixed in at least one complementary partial oxidation zone with at least a second portion of F2 and oxygen, added alone or as a mixture, to increase the temperature of said first stream, then the stream of the mixture obtained is circulated in the shell of R to provide complementary heating of the reaction tubes before leaving said reactor-exchanger R.

The stream of the mixture obtained is also the heating stream HF. "HF" designates here a stream of composition with a flow rate and temperature which change during its circulation in the shell of R.

One or two or three or even between 4 and 8 complementary partial oxidation zones may in general be used. Preferably, between 1 and 4 complementary partial oxidation zones may be used, highly preferably 2 to 3 complementary partial oxidation zones. This staged combustion allows a large amount of heat to be transferred, supplied in temperature increments, with intermediate chilling when transferring heat to the reaction tubes, without reaching the particularly high temperatures which would be obtained if all of the partial oxidation were to be carried out in a single step.

These partial oxidation zones (initial and/or complementary) may be internal and/or external to the shell of the reactor-exchanger R.

In a first variation of the process of the invention, the complementary partial oxidation zone or zones is (are) disposed inside the shell of the reactor reaction R. The initial partial oxidation zone may also be a zone which is internal to the reactor-exchanger R.

Typically, the complementary partial oxidation zone is a zone which is free of reaction tubes and is substantially contiguous to the internal wall of the shell of the reactor-exchanger R.

Highly preferably, the formation of flames in contact with the reaction tubes is avoided.

In a first implementation of the partial oxidation mode, it may be carried out in the case of this first variation by limiting the presence of flames to one or more zone or zones which is (are) free of reaction tubes, in particular contiguous with the internal wall of the shell of the shell (37) of the reactor-exchanger R. In particular, one or more flat or short flame burners may be used in known manner, and/or multiple small burners which produce smaller flames as a result.

In a further partial oxidation implementation, at least part of F2 and oxygen, preferably in the presence of steam, are injected at one point inside the shell of the reactor-exchanger under turbulent conditions and/or with sufficient recirculation to obtain partial oxidation (initial and/or complementary) in a homogeneous combustion zone in at least one zone of the reactor-exchanger R.

To produce combustion conditions which are as homogeneous as possible, relatively moderate temperatures may be used (for example less than 1200° C., or less than 1150° C., for example in the range 1000° C. to 1180° C.) to more readily carry out flameless homogeneous combustion (oxidation). The range of suitable conditions (concentrations and temperatures) for such a homogeneous combustion regime may be precisely determined by modelling the combustion and/or by tests by causing the gas recirculation and turbulence to be varied). Homogeneous combustion is favoured by a highly turbulent mixture of reagents and by recirculating them. Preferably, homogeneous partial oxidation is carried out in the immediate proximity of the steam reforming tubes and the heat of partial oxidation is immediately transferred to the tubes. Homogeneous partial oxidation may then be continued at the steam reforming tubes as it does not generate hot spots which might deteriorate them. It then becomes possible to render the temperatures in the reactor-exchanger more homogeneous, which can optimize heat transfer, reduce the number of complementary partial oxidation zones and/or limit the local maximum effective temperature of the fluid HF, which is favourable from the point of view of the service life of the equipment.

In a third implementation of combustion, at least a portion of F2 and oxygen, preferably supplemented with steam, are injected at one point inside the shell of the reactor-exchanger upstream of a catalytic combustion zone under conditions in which the temperature of the mixture obtained is lower than the temperature at which combustion occurs with a flame. Catalytic combustion is a technique which is well known in the combustion field, and may use various catalysts. Reference may, for example, be made to the following patent applications or patents: US20050081443; U.S. Pat. No. 5,980,843; U.S. Pat. No. 5,405,260; EP-B1-0 689 870; EP-B1-0 712 661. The initial and final temperature zones allowing catalytic combustion to be carried out under the best conditions may be determined by tests for a given catalyst. The preferred initial temperatures of the mixture (before combustion) are below 900° C., and usually in the range 800° C. to 880° C. The preferred final temperatures (after combustion) are below 1000° C., and usually in the range 800° C. to 980° C. Further, catalytic combustion may advantageously be limited to the coldest part of the reactor-exchanger R. Thus, if the stream comprising the first feed F1 supplemented with steam enters at one end of the reactor-exchanger, the catalytic combustion zone is typically located in the first half of the reactor-exchanger relative to that end.

In a second variation of the process of the invention, the complementary partial oxidation zone(s) (42, 44) and/or the initial partial oxidation zone may be disposed outside the shell (37) of the reactor-exchanger R. This option results in a less compact embodiment, but allows standard dimensions for burners and combustion zones to be utilized.

It is also possible to combine one or two external partial oxidation zones (for example the initial zone) and one or two or more internal partial oxidation zones.

The heating fluid HF may be circulated in different manners.

Usually, the stream comprising the feed F1 supplemented with steam circulates in the reactor-exchanger essentially in one direction, and the heating fluid HF circulates at least generally as a counter-current with respect to F1 (i.e. either as a pure counter-current, HF circulating parallel to the tubes, or locally as a cross-current, but overall as a counter-current).

Co-current circulation is possible, however. In this case, if the stream comprising the feed F1 supplemented with steam circulates in the reactor-exchanger essentially in one direction, the heating fluid HF circulates at least generally as a co-current with respect to F1 (pure or general co-current).

The two synthesis gases SG1 and SG2 are usually mixed outside the reactor-exchanger. However, as an alternative, they may be mixed in the reactor-exchanger, in particular at one or its ends. This configuration is easier if F1 and HF circulate as a co-current, the two gases SG1 and SG2 being produced at the same end of the reactor-exchanger R.

The respective pressures P1 and P2 of SG1 and SG2 at the outlet from the reactor-exchanger satisfy the following conditions:

0.8 MPa<P1<12 MPa; preferably, 1.5 MPa<P1<5 MPa; and highly preferably, 1.8 MPa<P1<4.5 MPa;

0.8 MPa<P2<12 MPa; preferably, 1.5 MPa<P2<5 MPa; and highly preferably, 1.8 MPa<P1<4.5 MPa.

Generally, pressures P1 and P2 are close: |P2−P1|<0.35 MPa; preferably |P2−P1|<0.30 MPa; and highly preferably, |P2−P1|<0.25 MPa.

Usually, P2>P1. Frequently, SG2, at the outlet from the reactor-exchanger R exchanges heat with the stream comprising the feed F1 supplemented with steam for final pre heating or partial steam reforming (or pre steam reforming) of said stream before it enters the reactor-exchanger R. Thus, SG2 typically undergoes a pressure drop before mixing it with SG1 and typically, P2>P1.

In general, at the outlet from the reactor-exchanger R, SG2 exchanges heat with the stream comprising feed F1 supplemented with steam to partially steam reform said stream prior to its entry into the reactor-exchanger R in a reactor heat exchanger (primary, typically different from R and with the reference 2*b*), then is mixed with the stream SG1 leaving the reactor-exchanger R to form a synthesis gas SG which pre heats, in a heat exchanger (reference 2*a* as below), the stream comprising the feed F1 supplemented with steam just upstream of the reactor-exchanger (2*b*). Thus, the thermal potentials of SG1, which is relatively colder, and SG2, which is relatively higher, are used effectively, supplying heat at a relatively high temperature necessary for preliminary partial steam reforming. Said pre steam reforming, which is implemented in a manner similar to that of steam reforming, carried out in a tube reactor-exchanger containing a steam reforming catalyst, is typically carried out at temperatures 100° C. to 200° C. lower than that for steam reforming.

The feed F1 supplemented with steam is typically preheated to between 500° C. and 700° C. (and preferably to between 580° C. and 700° C.) before it enters the reactor-exchanger R. The temperature of SG1 at the outlet from the reactor-exchanger R is typically in the range 800° C. to 950° C. (preferably in the range 820° C. to 900° C.), and the temperature of SG2 at the outlet from the reactor-exchanger R is typically in the range 850° C. to 1150° C., more preferably in the range 900° C. to 1050° C.

The invention also concerns a process for producing hydrogen from a synthesis gas SG which is produced.

The invention will be better understood from the following description of the accompanying Figures in which:

FIG. 1 shows a simplified flowchart for the process of the invention;

FIG. 2 shows another simplified flowchart for the process of the invention, showing a reactor-exchanger comprising internal partial oxidation zones in more detail;

FIG. 3 shows a section through the reactor-exchanger of FIG. 2;

FIG. 4 shows another simplified flowchart for the process of the invention, showing a reactor-exchanger comprising external partial oxidation zones in more detail;

FIGS. 5*a* and 5*b* show simplified flowcharts for the process of the invention in facilities comprising several reactor-exchangers.

DESCRIPTION OF THE FIGURES

Reference will initially be made to FIG. 1.

The stream comprising the feed F1 supplemented with steam, i.e. the steam reforming feed, is a mixture of a generally purified gas typically comprising more than 80 molar % of methane and 2% to 15% of ethane, and steam with a $H_2O$/F1 molar ratio which is typically in the range 1.8 to 3.5. This stream enters via a line 1 into the preheating exchanger 2*a* then traverses the reactor-exchanger 2*b* in which pre-steam reforming is carried out with a relatively moderate outlet temperature, typically in the range 650° C. to 770° C., preferably in the range 670° C. to 740° C. The reactor-exchanger 2*b* is a multi-tube reactor with tubes containing a steam reforming catalyst, for example one of the catalysts described in the examples in U.S. Pat. No. 4,906,603. At the outlet from the reactor-exchanger 2*b*, the stream comprising the first feed F1 supplemented with steam, partially converted into synthesis gas, supplies the principal reactor-exchanger R via a line 3, which reactor-exchanger is also multi-tubular with tubes containing a steam reforming catalyst, typically of the same type as that of the reactor-exchanger 2*b*. This stream is then distributed into a plurality of reaction tubes 38 disposed inside the shell 37 of the reactor-exchanger then, after steam reforming, leaves the reactor-exchanger R via a line 4, forming a first synthesis gas SG1, and is cooled in the exchanger 2*a*, mixed with the second synthesis gas SG2.

A further portion F2 of the overall feed F supplies a partial oxidation chamber 40 via a hydrocarbon inlet 41*a*; the chamber is also supplied with oxygen via a line 41*b*. The feed F2 and/or oxygen supply may typically be supplemented with steam (for example 20% to 50% molar of steam) to limit the risk of carbon formation (soot). The outlet temperatures from the partial oxidation chamber 40 are typically in the range 1100° C. to 1250° C., preferably in the range 1140° C. to 1200° C. This temperature may be controlled by modulating the $O_2$/(F2 hydrocarbons) molar ratio, which is usually in the range 0.48 to 0.85.

The heating fluid HF which is thus formed enters the reactor-exchanger R in which flameless combustion may occur, and transfers a substantial portion of the heat of partial oxidation to the reaction tubes 38, thus allowing steam reforming of F1. The stream HF leaves the reactor-exchanger R via the line 27 to form a second synthesis gas SG2. Said synthesis gas SG2, the temperature of which at the reactor-exchanger R outlet is still high, for example of the order of 1000° C., supplies the reactor-exchanger 2*b* for pre-steam reforming of the feed F1, where it is used as a heating fluid, then leaves 2*b* via line 28, and is mixed with the synthesis gas SG1 circulating in line 4, then the mixture SG which is formed is cooled in the exchanger 2*a* from which it leaves via a line 29. The synthesis gas SG can thus undergo supplemental treatments such as more severe cooling, steam conversion of CO, chemical conversion, etc. By means of 2*a* and 2*b*, the facility of FIG. 1 has good thermal recovery, in particular for the hottest effluent from the reactor-exchanger R, i.e. SG2.

Figure 1:
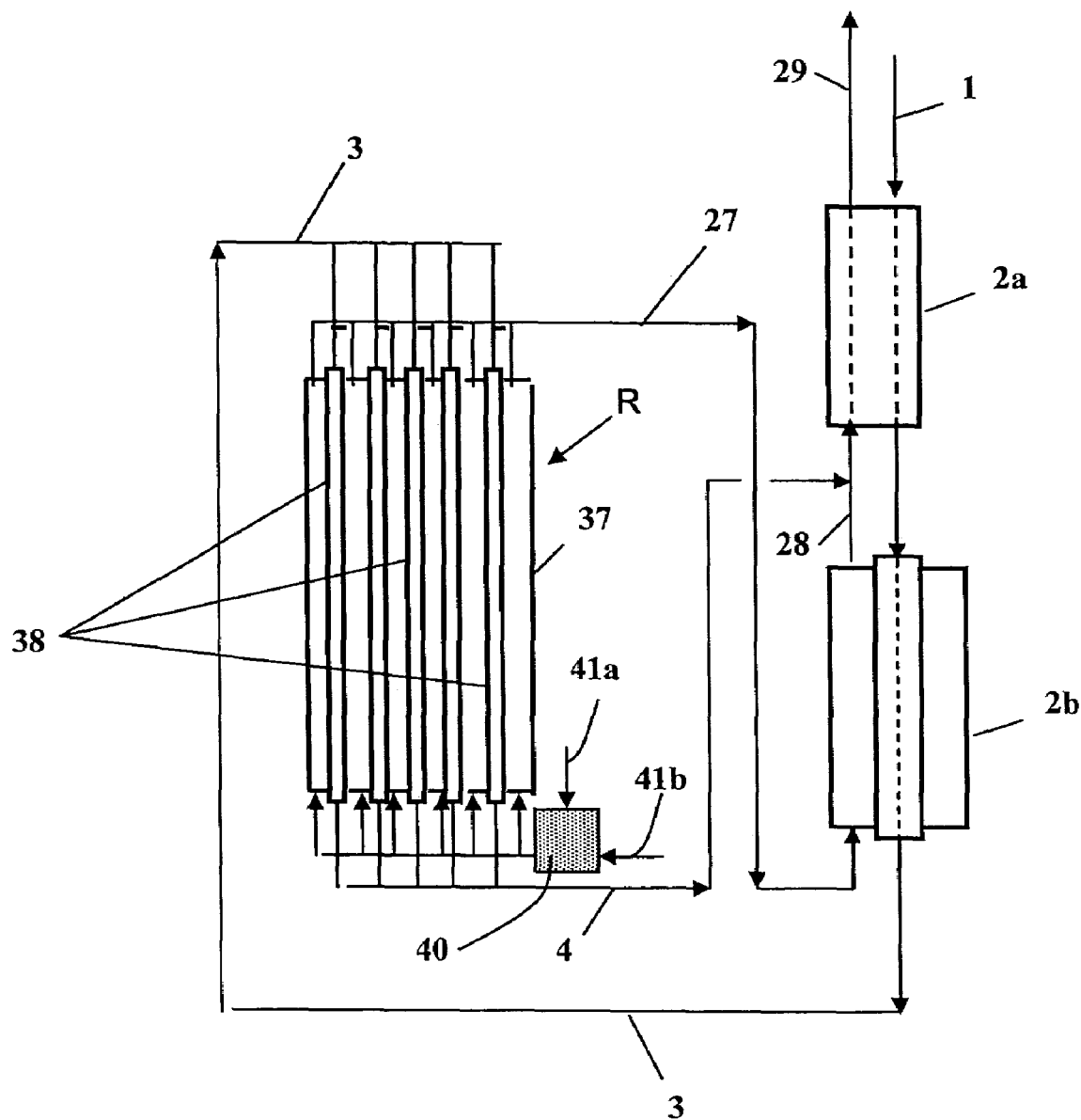
Figure 2:
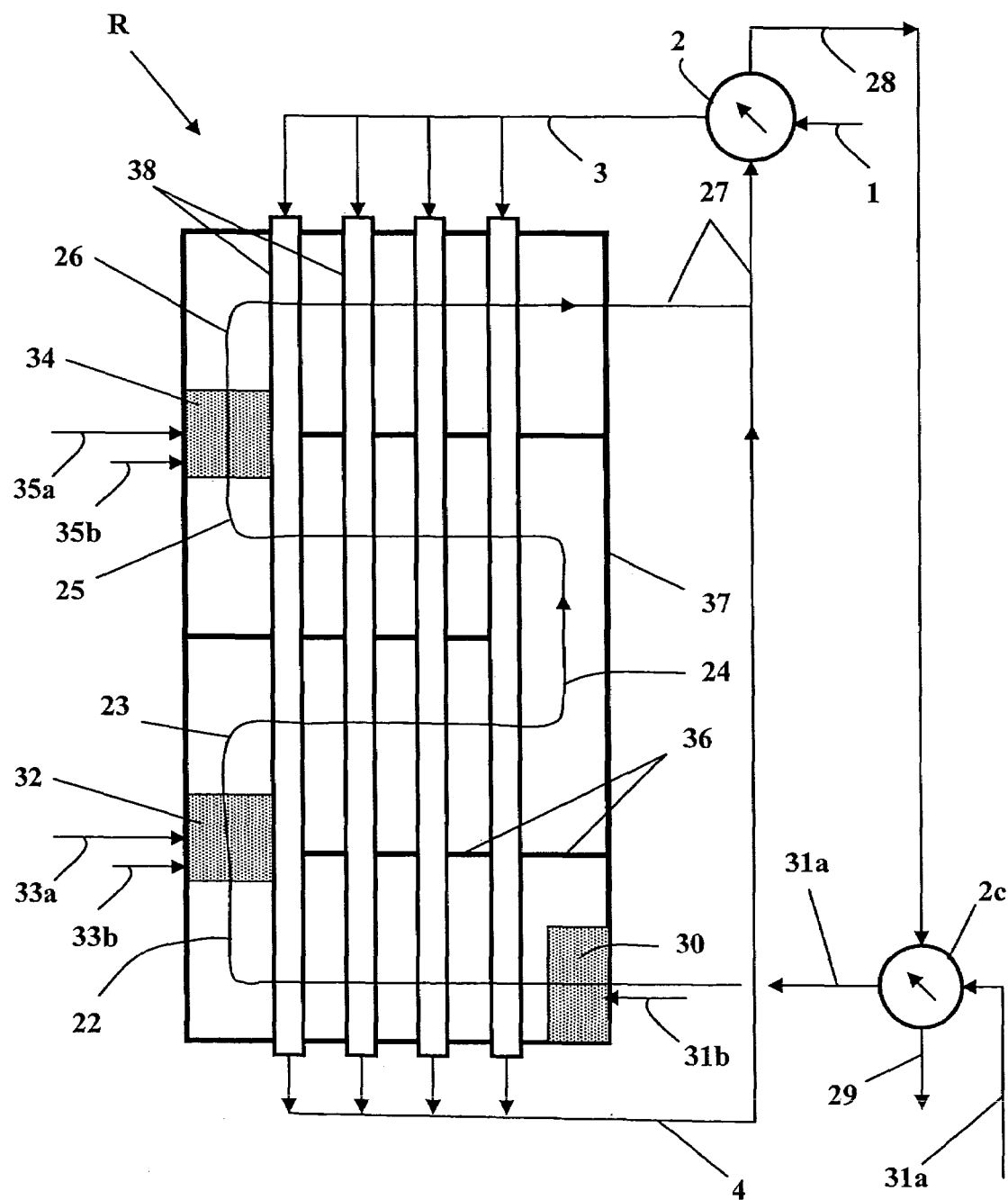

Referring now to FIG. 2, the reactor-exchanger R of FIG. 2 comprises 3 chambers, or partial oxidation zones in series, so that said staged partial oxidation can transmit more heat to the steam reforming tubes 38 and/or employ lower maximum temperatures for HF. Said 3 zones: 30 (initial zone), 32 and 34 (complementary zones) are inside the shell 37 of R. Said zones 30, 32 and 34 are supplied with hydrocarbons from the feed F2 (typically supplemented with steam) respectively via lines 31*a*, 33*a* and 35*a*. They are also supplied with oxygen respectively via lines 31*b*, 33*b* and 35*b*. Steam may also be present under the conditions described for the facility of FIG. 1.

The heating fluid circulates inside R as a cross-current and an overall counter-current following the circulation line shown in FIG. 2 as indicated by reference numerals 22, 23, 24, 25 and 26. Said circulation is imposed by the presence of stays or chicanes 36 in the reactor-exchanger R, in a manner analogous to the stays or chicanes of the shell of a tube heat exchanger and a conventional shell.

Recovery of heat from the effluents from the reactor-exchanger R of the device of FIG. 2 is also highly effective, but differs from that of FIG. 1: again, two exchangers are used, which have reference numerals 2 and 2*c*, but only exchanger 2 transmits heat to the steam reforming feed F1, while exchanger 2*c* transmits heat to the partial oxidation feed F2, supplemented with steam. Thus, the several streams feeding R are pre-heated, in particular the steam reforming feed and the partial oxidation feed F2. It is also possible to pre-heat the fluids added to HF during the staged partial oxidation, in particular the hydrocarbons and/or steam, and/or to pre-heat the oxygen.

Figure 3:
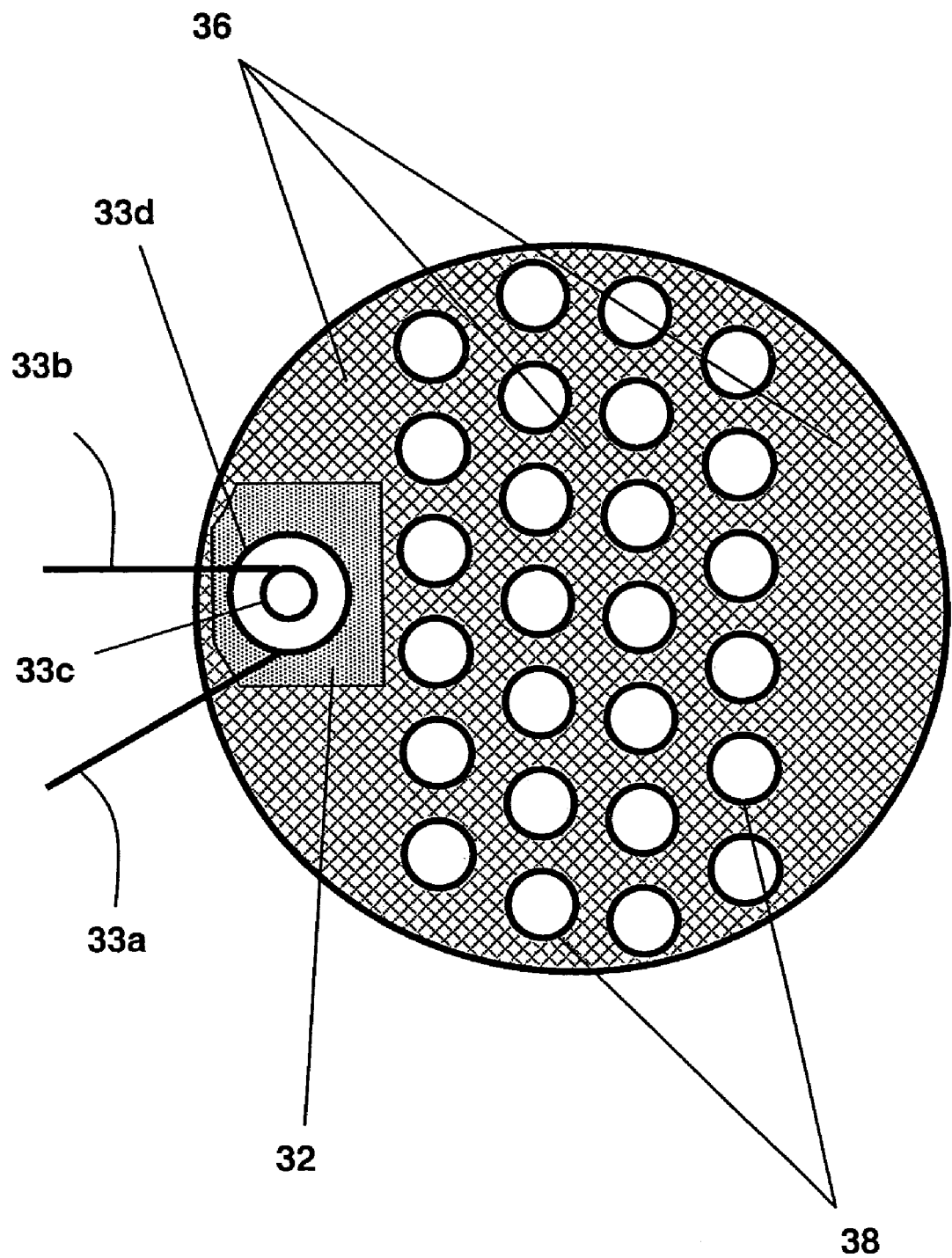

FIG. 3, which shows a top view of a section of the reactor-exchanger R of FIG. 2 above zone 32, shows a top view of said stays 36. The partial oxidation zone 32 has a burner, hydrocarbons and oxygen being introduced via lines 33*a* and 33*b* which tangentially supply two concentric tubes 33*d* and 33*c* to create rapid mixing by contra-rotating vortices.

The ends of the reactor-exchanger R of FIG. 2 are typically domed (not shown for clarity reasons in the Figure) and R encompasses all of the reaction tubes 38.

The facility of FIG. 2 shows only one heat exchanger 2, but could also comprise reactor-exchangers and/or heat exchangers such as 2*a* and 2*b* of the facility in FIG. 1.

The reactor-exchanger R of FIGS. 2 and 3 shows only one type of reactor-exchanger which can be used to carry out the process of the invention; other types of reactor-exchanger R may be used without departing from the scope of the invention, including reactor-exchangers having bayonet tubes. In that type of reactor-exchanger, each of the reaction tubes 38 comprises two concentric tubes and the steam reforming feed circulates in succession in the annular space then in the inner central tube or in the reverse direction, the inlet stream F1 and the stream SG1 respectively entering and leaving at the same end of R.

Figure 4:
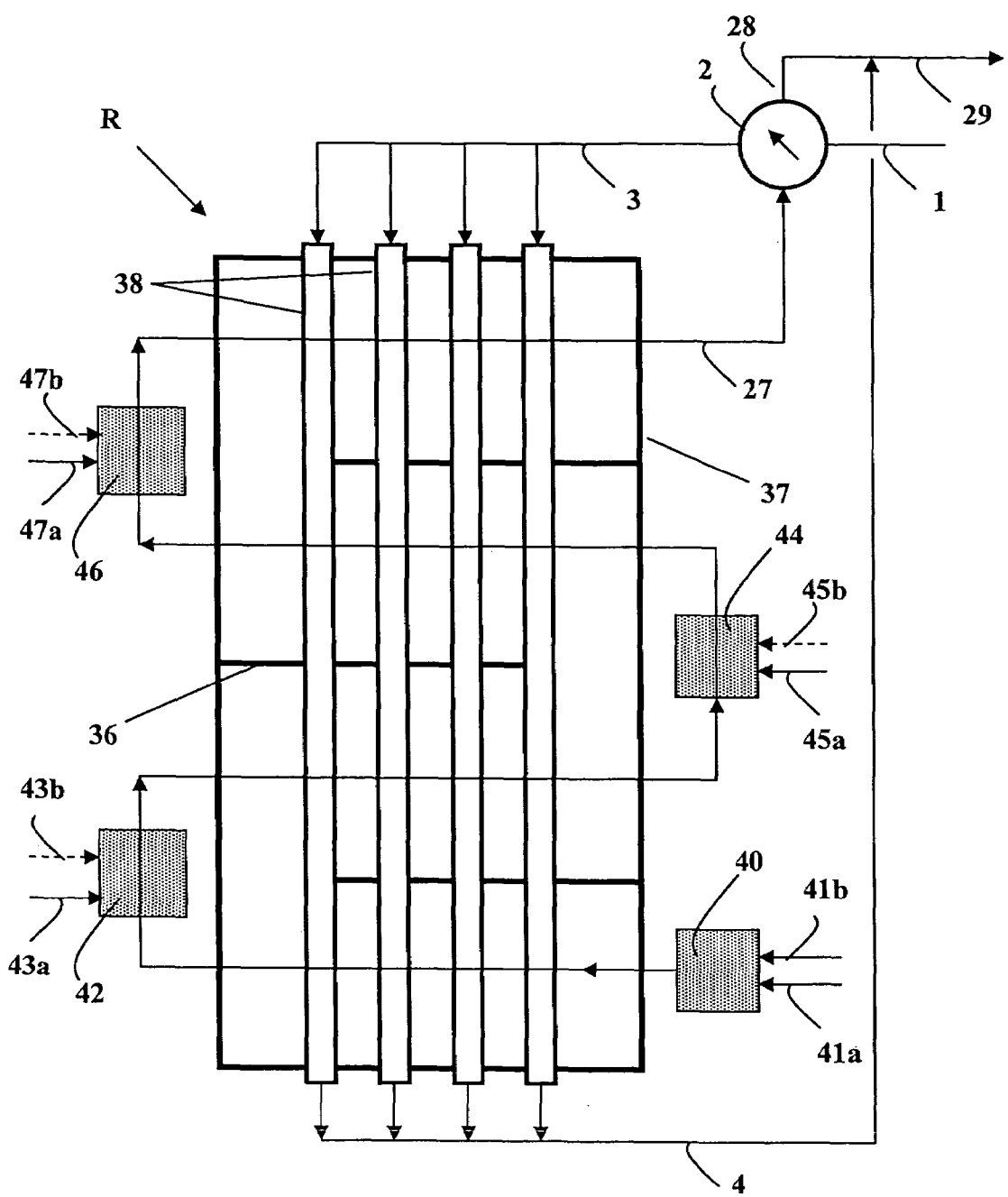

The facility of FIG. 4 is close to that of FIG. 2, but uses external partial oxidation zones which are not inside R, allowing the use of standard burners and/or oxidation zones without problems with bulk at the price of a less compact implementation. Said zones 40, 42 and 44 are supplied with F2 hydrocarbons via lines 41*a*, 43*a* and 45*a* respectively. They are also supplied with oxygen via lines 41*b*, 43*b* and 45*b* respectively. Steam may also be present under the same conditions as for the facility of FIG. 1.

FIG. 3*a* shows a facility comprising three reactor-exchangers R1, R2 and R3, traversed in parallel by stream portions comprising the first feed F1 supplemented with steam, and traversed in series by a staged partial oxidation stream HF, with intermediate re-heating of HF between two successive reactor-exchangers. Such a facility could comprise not three but two, four or, in general, a plurality of reactor-exchangers Ri.

Figure 5A:
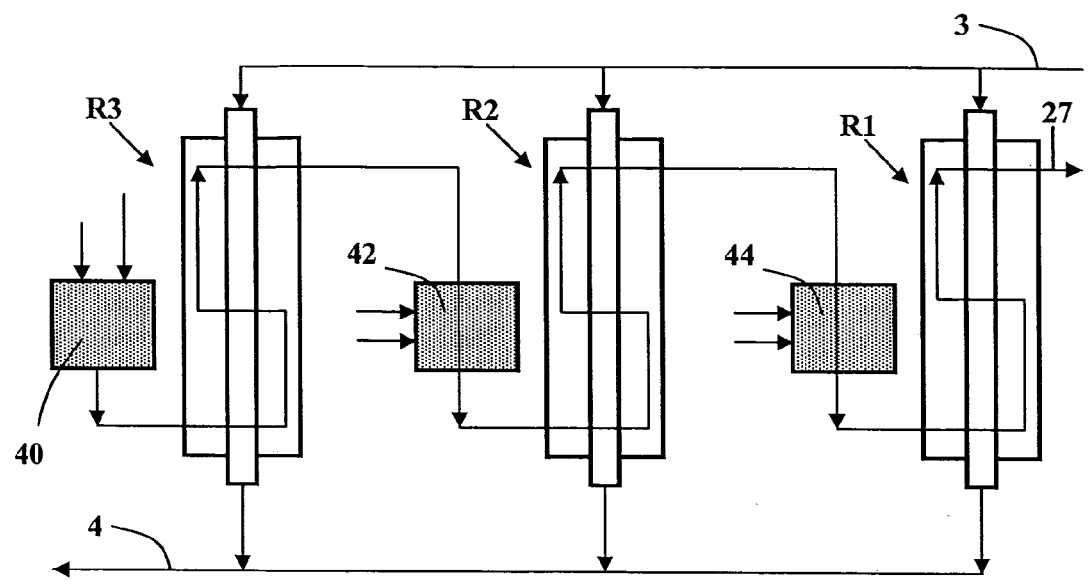
Figure 5B:
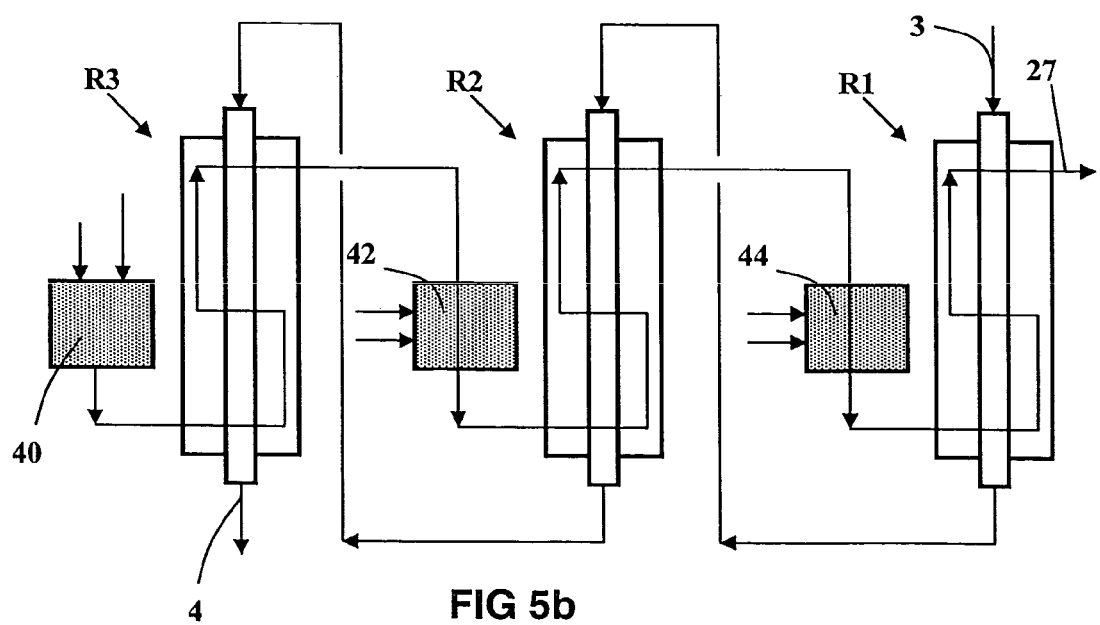

The facility of FIG. 5*b* is close to that of FIG. 5*a* but uses, for the stream comprising the first feed F1, circulation in series (staged steam reforming) in exchangers R1, R2, R3, as a counter-current together with the partial oxidation stream HF, which is also staged. This configuration can result in very high thermal recovery and energy efficiency as reactor-exchanger R1 can carry out pre-steam reforming which may be operated at a relatively low temperature. Similarly, the facility of FIG. 5*b* could comprise not three but two, four or in general a plurality of reactor-exchangers Ri.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, all parts and percentages are by weight, unless otherwise indicated.

EXAMPLE

Production of a synthesis gas SG at a pressure of 2.5 MPa from a natural gas was simulated in a facility of the type shown in FIG. 2. Feeds F1 and F2 had identical compositions (natural gas supplemented with methane).

The inlet conditions (line 1) were as follows: F1=natural gas, with a flow (of methane) of 50000 NM$^3$/h; F1 was supplemented with H$_2$O (steam) with a H$_2$O/F1 molar ratio of 3 (H$_2$O and F1, in % molar). The F1+H$_2$O stream was pre-heated to 600° C. in exchanger 2, then supplied the reactor-exchanger R at a pressure of 2.5 MPa which was the pressure of the facility (for simulation, the pressure drops were not taken into account). After catalytic steam reforming with an outlet temperature of 850° C. (in line 4), the first synthesis gas SG1 obtained was mixed with the second synthesis gas SG2 circulating in line 27, the mixture SG1+SG2 supplying the heat exchanger 2.

In the partial oxidation zone 30, 100433 NM$^3$/h of methane supplemented with saturating steam (H$_2$O/methane ratio=1, molar %) was supplied via line 31*a*, and 64650 NM$^3$/h of oxygen was supplied via line 31*b* to form, by partial oxidation, a first heating fluid HF at 1150° C., which was cooled to 1000° C. in the reactor-exchanger R before being re-heated in the complementary second partial oxidation zone 32. 20883 NM$^3$/h of methane and 19776 NM$^3$/h of oxygen were supplied to zone 32 with steam ($H_2O$/methane=1, molar %). The methane was supplied at 20° C., and the steam under saturated vapour conditions. Said complementary partial oxidation raised the HF temperature to 1150° C. The HF again transmitted heat to the tubes 38 and its temperature fell to 845° C.

Next, the second complementary partial oxidation zone 34 was supplied with a flow of 28285 $NM^3$/h of methane and 12993 $NM^3$/h of oxygen, with steam ($H_2O$/methane=1, molar %) under the same conditions as for zone 32. Said zone 34 was a catalytic oxidation zone and used a catalyst comprising 5% by weight of rhodium as described in Example 1 of United States patent application US 2002/0004450 A1, or that of Example 1 of U.S. Pat. No. 5,510,056. The overall mixture with HF of said catalytic complementary partial oxidation (this mixture also being an HF fluid) raised the initial temperature of the HF to 900° C. The HF again transmitted heat to the tubes 38, and its temperature fell to 750° C. at the outlet from R, forming a second synthesis gas SG2 which circulated in line 27.

Said second synthesis gas SG2 was mixed with SG1 to form an overall synthesis gas SG which was cooled to 662° C. in heat exchanger 2 then rejoined, via line 28, the heat exchanger 2c in which it was cooled to 546° C. Said exchanger 2c pre-heated the feed F2 supplemented with steam to 500° C.

The synthesis gases SG1, SG2 and the final synthesis gas SG obtained (which comprised 469182 $NM^3$ of $H_2$+CO) had the following compositions, in % molar, taking $H_2O$ into account:

| Molar % | SG1: steam reforming effluent (line 4) | SG2: POX effluent (lines 27, 28) | SG: final synthesis gas (line 29) |
| --- | --- | --- | --- |
| $H_2$ | 47.9 | 45 | 46 |
| CO | 8.9 | 16.3 | 13.8 |
| $CO_2$ | 5.3 | 7.5 | 6.8 |
| $CH_4$ | 3.7 | 2.3 | 2.8 |
| $H_2O$ | 34.2 | 28.9 | 30.6 |

The synthesis gas SG may be subjected downstream to CO steam conversion, to produce hydrogen. It may also be used, often after adjusting the $H_2$/CO ratio (for example by separating excess hydrogen) for a chemical conversion, for example of alcohols or other oxygenated compounds, or olefins and/or paraffins.

The entire disclosure[s] of all applications, patents and publications, cited herein and of corresponding French Application No. 05/09.670, filed Sep. 21, 2006 is incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for producing a synthesis gas, SG, from overall feed F constituted by hydrocarbons and optionally from recycled compounds, F comprising a first feed F1 and a second feed F2, in which:
   a stream comprising the first feed F1 supplemented with steam undergoes steam reforming to produce a first synthesis gas SG1 in at least one multi-tube reactor-exchanger R comprising a plurality of reaction tubes (38) containing a steam reforming catalyst, said first feed F1, steam and said first synthesis gas SG1, said reaction tubes being housed within a shell;
   said reaction tubes (38) are heated principally by convection by circulating in said shell a heating fluid HF external to said tubes, in which HF is a substantially free of nitrogen first partial oxidation stream of the second feed F2 at a pressure in the range of 0.5 to 12 MPa, said first partial oxidation stream being formed within only the shell or immediately upstream of said reactor-exchanger R to produce a second synthesis gas SG2 within said shell, said heating fluid HF transferring heat to said reaction tubes, thereby being cooled, said cooled heating fluid HF being then reheated in 1-8 complementary successive partial oxidation zones (32, 34, 42, 44) fed by at least one second portion of said second feed F2 and oxygen, to increase the temperature of successively heated and then cooled partial oxidation streams, the resultant mixture circulating in the shell of R serving to provide complementary heat to the reaction tubes before leaving said reactor-exchanger R, and wherein synthesis gas SG1 and SG2 produced by different processes are in indirect heat exchange relationship with each other in the same reactor-exchanger R;
   and synthesis gas SG is produced by mixing resultant SG1 and SG2.

2. A process according to claim 1, in which at least one of said complementary partial oxidation zones is disposed inside the shell (37) of the reactor-exchanger R.

3. A process according to claim 2, in which said complementary partial oxidation zone (32, 34) comprises a zone which is free of reaction tubes and substantially contiguous with the internal wall of the shell (37) of the reactor-exchanger R.

4. A process according to claim 1, in which at least a portion of F2 and oxygen, are injected at a point inside the shell of the reactor-exchanger under turbulent conditions sufficient to obtain homogeneous complementary partial oxidation in the immediate vicinity of said reaction tubes in at least one zone of the shell of the reactor-exchanger R.

5. A process according to claim 1, in which at least a portion of F2 and oxygen, are injected at a point inside the shell of the reactor-exchanger R upstream of at least one catalytic partial oxidation zone, under conditions in which the temperature of the mixture obtained is lower than the temperature in which combustion occurs with a flame.

6. A process according to claim 5, in which said stream comprising the first feed F1 supplemented with steam enters the reactor-exchanger R at one end of R, and said catalytic combustion zone is located in the first half of the reactor-exchanger relative to said end.

7. A process according to claim 1, in which at least one of said complementary partial oxidation zones is disposed outside the shell (37) of the reactor-exchanger R.

8. A process according to claim 1, in which said stream comprising the feed F1 supplemented with steam circulates in the reactor-exchanger in essentially one direction, and said heating fluid HF circulates at least as an overall counter-current with respect to F1.

9. A process according to claim 1, in which said stream comprising the feed F1 supplemented with steam circulates in the reactor-exchanger essentially in one direction, and said heating fluid HF circulates at least as an overall co-current with respect to F1.

10. A process according to claim 1, in which the two synthesis gases SG1 and SG2 are mixed outside the reactor-exchanger, their respective pressures P1 and P2 at the outlet from the reactor-exchanger satisfying the conditions: 0.8 MPa<P1<12 MPa; 0.8 MPa<P2<12 MPa; and |P2−P1|<0.35 MPa.

11. A process according to claim 1, in which SG2, at an outlet from the reactor-exchanger R, exchanges heat with said stream comprising the feed F1 supplemented with steam, for final pre-heating or partial steam reforming of said stream before its entry into the reactor-exchanger R.

12. A process according to claim 11, in which SG2, at the outlet from the reactor-exchanger R, exchanges heat with the stream comprising the feed F1 supplemented with steam, for partial steam reforming of F1 prior to its entry into R in a reactor-heat exchanger (2b), then SG2 is mixed with the stream SG1 leaving the reactor-exchanger R to form a synthesis gas SG which pre-heats, in an exchanger (2a), said stream comprising the feed F1 supplemented with steam, just upstream of the reactor-exchanger (2b).

13. A process according to claim 1, in which said stream comprising the feed F1 supplemented with steam is pre-heated to between 500° C. and 700° C. before it enters the reactor-exchanger R, the temperature of SG1 at the outlet from the reactor-exchanger R is in the range of 800° C. to 950° C., and the temperature of SG2 at the outlet from the reactor-exchanger R is in the range of 850° C. to 1150° C.

14. A process for producing hydrogen from a synthesis gas SG derived from the process according to claim 1.

15. A process according to claim 4, wherein said at least a portion of F2 and oxygen are injected in the presence of steam at a point inside the shell of the reactor-exchanger.

16. A process according to claim 5, wherein said at least a portion of F2 and oxygen are injected in the presence of steam at a point inside the shell of the reactor-exchanger.

17. A process according to 10, in which said stream comprising the feed F1 supplemented with steam is pre-heated to between 500° C. and 700° C. before it enters the reactor-exchanger R, the temperature of SG1 at the outlet from the reactor-exchanger R is in the range of 800° C. to 950° C., and the temperature of SG2 at the outlet from the reactor-exchanger R is in the range of 850° C. to 1150° C.

18. A process according to claim 1, comprising at least 2 successive complementary partial oxidation zones spaced are one another so that the resultant HF when cooled by heat exchange is successively reheated within said shell so as to maintain gas within the reaction tubes at a sufficient temperature to maintain the syngas reaction.

19. A process according to claim 2, in which at least one of said complementary partial oxidation zones is disposed outside the shell (37) of the reactor-exchanger R.

20. A process according to claim 18, wherein said first partial oxidation zone is disposed within the shell.

21. A process according to claim 20, wherein all partial oxidation zones are disposed within the shell.

22. A process according to claim 4, wherein substantially throughout the shell, said turbulent conditions are maintained, thereby avoiding hot spots.

23. A process according to claim 21, in which at least a portion of F2 and oxygen, are injected at several points inside the shell of the reactor-exchanger under turbulent conditions sufficient to obtain homogeneous complementary partial oxidation in the immediate vicinity of said reaction tubes in at least one zone of the shell of the reactor-exchanger R.

24. A process according to claim 1, wherein all partial oxidation zones are disposed within the shell.

* * * * *